United States Patent [19]

Bompani

[11] 4,008,424
[45] Feb. 15, 1977

[54] BIDIRECTIONAL SPEED CONTROL SYSTEM

[75] Inventor: Gian Battista Bompani, Montale Rangone (Modena), Italy

[73] Assignee: Honeywell Information Systems Italia, Caluso, Italy

[22] Filed: Jan. 2, 1974

[21] Appl. No.: 430,249

[30] Foreign Application Priority Data

Dec. 28, 1972 Italy .................................. 3377/72

[52] U.S. Cl. ................................ 318/293; 318/327
[51] Int. Cl.$^2$ ........................................... H02P 5/06
[58] Field of Search .......... 318/327, 293, 345, 678, 318/687; 307/230, 262; 332/44; 328/142

[56] References Cited

UNITED STATES PATENTS

| | | | |
|---|---|---|---|
| 3,471,759 | 10/1969 | Broverman | 318/678 |
| 3,745,436 | 7/1973 | Buttafava | 318/327 |
| 3,811,098 | 5/1974 | Williams | 307/230 |

OTHER PUBLICATIONS

"Transformerless Modulator", Riso, V., IBM Tech. Discl. Bulletin, vol. 12, No. 3, 8/69.
Tenny, Ralph, "The Operational Amplifier," Popular Electronics, vol. 35, No. 2, Aug. 1971, pp. 30–40.

Primary Examiner—James R. Scott
Assistant Examiner—John J. Feldhaus
Attorney, Agent, or Firm—Nicholas Prasinos; Ronald T. Reiling

[57] ABSTRACT

An error voltage signal which is of magnitude related to the difference between the actual speed of a d.c. motor and a desired speed is selectively applied to either the inverting input terminal of an operational amplifier or to its non-inverting input terminal, dependent upon the direction of rotation of the motor. The circuit components connecting the error signal to the input terminals are selected to provide the same absolute value of gain for the amplifier regardless of whether the input is to the inverting terminal or to the non-inverting terminal. The system substantially reduces complexity and diminishes the number of components required for this type of bidirectional speed regulation.

13 Claims, 5 Drawing Figures

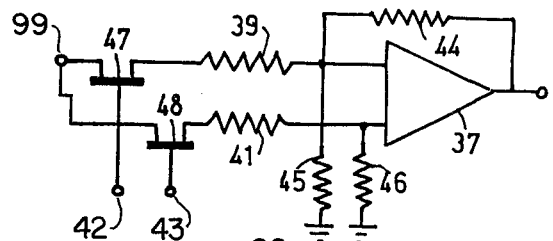
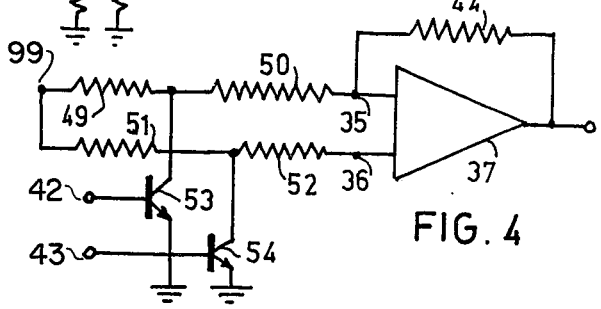
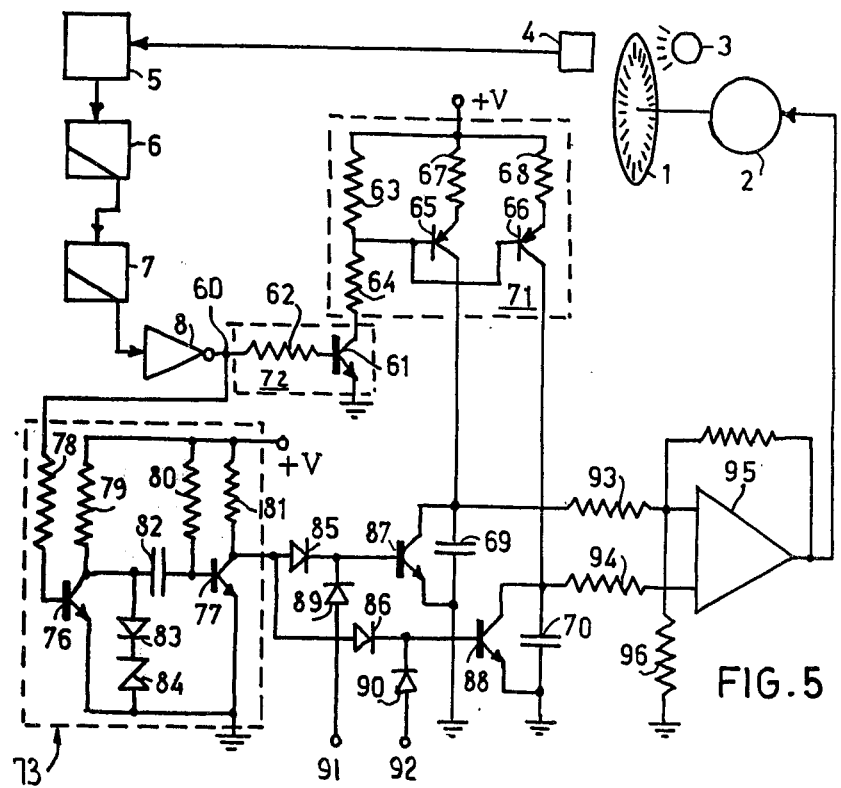

BIDIRECTIONAL SPEED CONTROL SYSTEM

BACKGROUND OF THE INVENTION

The present invention relates to a bidirectional rotational speed control system for motors, profitably employed for controlling either the forward or the backward speed of the magnetic medium in magnetic recording equipments or magnetic tape transport units.

It is known that, in such units, the magnetic tape is driven by either a driving roller or a single capstan, over the periphery of which the tape is partially wound or against which the magnetic tape is pressed by a pressure roller.

The capstan is driven by a motor controlled by a proper regulating circuit. In U.S. Pat. No. 3,740,633 a frequency to voltage transducer is described, which is particularly useful in obtaining precise information on the rotational speed, and to supply a proper feedback signal which may be used in a control circuit. A complete regulation system is schematically represented, as an example, in FIG. 1 of said patent. In U.S. Pat. No. 3,745,436 a regulation system for a magnetic tape unit provided with such a transducer device is described. In particular, to obtain a "bidirectional" speed control, that is in the forward and backward direction, it was required to employ two different transducer devices which delivered, respectively, a positive voltage signal and a negative voltage signal, selectively applied to an amplifier circuit. Such a control system is represented, as a simplified block diagram, in FIG. 3 of said U.S. Pat. No. 3,745,346 and in the present patent application the prior art represented by such FIG. 3 of the patent is incorporated as FIG. 1.

SUMMARY OF THE INVENTION

The present invention aims at reducing the complexity and the economic cost of the control system of U.S. Pat. No. 3,745,346. According to an aspect of the invention, the object of the invention is obtained by alternatively employing either the inverting or the non-inverting input lead of an operational amplifier and by selectively applying to one of said inputs a voltage signal, delivered by a single frequency-to-voltage transducer circuit of the type described in said U.S. Pat. No. 3,740,633. According to a second aspect of the invention, the aforesaid frequency-to-voltage transducer circuit, is provided with a terminal stage for driving both input leads of an operational amplifier.

BRIEF DESCRIPTION OF THE DRAWINGS

These and other features of the invention will be better understood by the following description, having exemplifying and not limiting purposes with reference to the attached drawings, wherein:

FIG. 3 represents a first variant of such improvements;

FIG. 4 represents a second variant of such improvements; and

FIG. 5 represents a preferred embodiment of a control system, according to the invention, showing in detail only the essential parts and the introduced improvements.

DETAILED DESCRIPTION OF THE INVENTION

Figure 1:
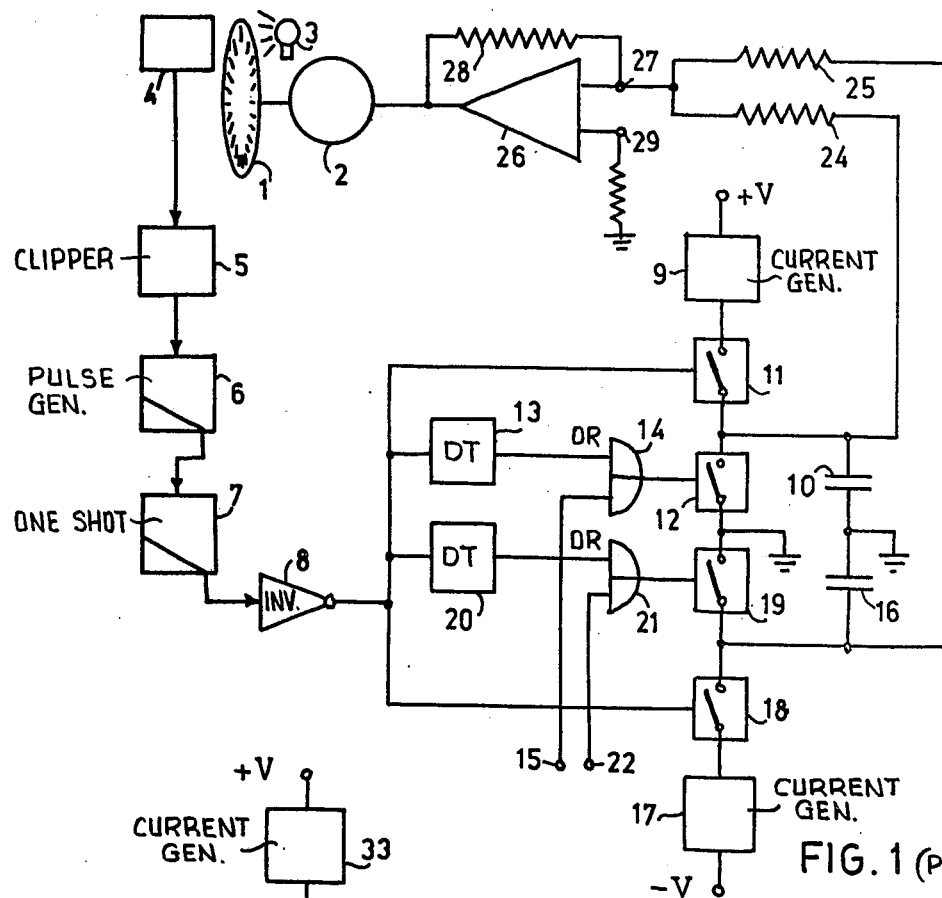
FIG. 1 shows a bidirectional speed control system as known in the prior art.

FIG. 1 is the simplified block diagram of the bidirectional speed control loop, already described in the U.S. Pat. No. 3,745,436.

In FIG. 1 an opaque disk 1 provided with transparent slots on its periphery is fixedly mounted on the shaft of the motor 2 and rotates with the same. The disk is interposed between a light source 3 and a photosensitive element 4 in such a way that during the rotation the photosensitive element is periodicaly illuminated, thus supplying a pulsing electrical signal having a pulse repetition rate proportional to the motor speed.

This signal is applied to a clipping amplifier 5, which therefore produces a square wave signal having the same frequency as the signal supplied by the photosensitive element. This signal controls a pulse generator circuit 6, which supplies in response very short pulses having the same pulse repetition frequency as aforesaid.

These pulses are applied to a high precision, rapid recovery, one shot circuit or monostable mulitvibrator 7 which supplies pulses of predetermined reference duration $T_o$. The output signal, after inversion by inverter 8 is therefore formed as a sequence of pulses having the same frequency as the pulse repetition rate of the pulses supplied by the photosensitive element but with each pulse having a duration equal to the difference between the period T of said frequency and the reference duration $T_o$. Thus the duration of said pulses varies with the pulse repetition frequency at the output of the photosensitive element and will be proportional to error in motor speed with respect to the nominal or desired speed of the motor. The duration $T_o$ is selected to be equal or substantially equal to the period corresponding to the desired motor speed so that the output pulses from the inverter 8 constitute error pulses.

The error signal supplied by inverter 8 controls two integrating circuits. One of these for instance comprises a constant current generator 9, fed by a positive voltage source +V, a capacitor 10, a first switching device 11 (preferably a solid state device) controlled by the inverter 8 which connects generator 9 to the capacitor 10 for the duration $T-T_o$ of the error pulses, and a second switching element 12 for short-circuiting at predetermined instants the capacitor 10 for very short intervals sufficient to discharge the same. The switching element 12 is controlled by the inverter 8 through a differentiating circuit 13 which, in correspondence with the leading edges of the pulses supplied by inverter 8 delivers very short pulses which control the closing of the switching element 12.

An OR gate 14 is provided to enable operation of the switch 12 either upon output of the circuit 13 or under the control of a binary external signal applied to terminal 15.

The second integrating circuit is substantially identical to the first one, but provides for charging the second capacitor 16 by a voltage of opposite polarity. This second integrator circuit is provided with the capacitor 16, a constant current generator 17 fed by a negative voltage source −V, a first switching device 18 controlled by inverter 8 and having identical functions as the switching device 11, a second switching element 19 having identical functions as the switching device 11, a differentiating circuit 20 controlled by inverter 8 and, between the output lead of this differentiating circuit and the control input lead of switching element 13, an OR gate 21 which permits discharge of the capacitor 16 also by means of an external signal applied to terminal 22.

The purpose of these integrating circuits is to convert the error pulses respectively in a positive and in a negative voltage, proportional to their duration. To this end, dependent upon absence of signals at one or the other of the terminals 15 and 22, one of the capacitors is charged by a constant current for the whole duration of the error pulse. The stored charge is maintained until the beginning of the following pulse, then discharged, and the process is repeated.

The voltage across the capacitor terminals, which is proportional to the duration of the error pulse, and therefore to the difference between actual and nominal value of the motor speed, is applied through one of the two resistors 24 and 25 to the input 27 of amplifier 26 which feeds the motor.

This operation of the described regulation loop is briefly as follows. In rest conditions both the integrators are inhibited, that it, binary signals at level ONE are applied at the control input terminals 15 and 22, so that switches 12 and 19 are closed and the capacitors 10 and 16 are discharged.

In this condition a null voltage is applied to the input 17 of the amplifier 26 through resistor 24 or 25 and the motor is at rest. To start the motor in a required direction, the signal applied to one of the control terminals, for instance terminal 15, is brought to binary ZERO. Thus the switch 12 is open and the capacitor 10 is free to be charged.

As the motor is at rest, the pulse generator 6 does not deliver any pulse, the output of inverter 8 is at binary ONE, thus closing the switch 11. The capacitor 10 is therefore charged up to the maximum voltage delivered by the constant current generator 9.

The amplifier 26 may conveniently consist in an operational amplifier, provided with a proper (negative) feedback through resistor 28. The amplifier is provided with two input terminals 27 and 29, respectively inverting and not inverting. The terminal 29 is grounded through a suitable resistor.

Such operational amplifiers are commercially available as integrated circuits and are marketed by a number of manufacturers. They are described by a wide assortment of literature, therefor further details and therefore are not necessary for an understanding of the invention.

It is known that an operational amplifier is substantially a differential amplifier characterized by very high gain and input impedance. If an input signal is applied to the inverting input through an input resistance, the resulting gain is given with sufficient approximation by $$A' = -R_f/R_a$$

where $R_f$ is the feedback resistance and $R_a$ the input resistance.

This result is easily obtained by applying the Kirkhoff's law to the input node, assuming the input impedance of the amplifier to be infinite and the voltage deviation of the input terminals between them and from ground to be negligible.

The sum of the currents converging on the input node must be zero. Therefore, if e is the output voltage and $e_1$ the voltage applied to the input through Ra, it must be: $e_1/Ra + e/R_f = 0$ that is: $e = e_i(-R_f)/Ra$. This equation which is better explained for instance in the book of Millmann & Taub, Pulse Digital and Switching Waveform published by McGraw-Hill 1965, chapters 1–8, is important in order to know the response of the amplifier to a plurality of input signals applied through different input resistances.

It will be, in the latter case, $$e_{i1}/Ra_1 + e_{i2}/Ra_2 + \ldots + e_{in}/Ran = e/R_f = 0$$

that is, $e = -(R_f e_{i1}/Ra1 + R_f e_{i2}/Ra_2 + \ldots + R_f e_{in}/Ran)$

This is the case in the system described wherein (FIG. 1) two signals are applied to the input node 27 of the amplifier 26 through the resistors 24 and 25.

However the control system under consideration here provides that the two signals be mutually exclusive. Therefore, resuming the description of the speed regulating loop, a saturation voltage Visat is present, upon starting the motor, on the capacitor 10 terminals and it is applied to the node 27 through the resistor 24.

If Ri is the resistance of resistor 24 and $R_f$ is the resistance of resistor 28, the motor is fed by a voltage $$e = -\frac{R_f}{R_i}$$

which starts the motor under a very high acceleration towards the steady state speed.

However, with the increase of the motor speed, the duration of the error pulses decreases and, at a speed sufficiently close to the required regulated speed the error voltage Vi decreases, the motor feeding voltage also decreases, and the speed is stabilized at a value lower than the nominal speed, but very close to the same.

To start the motor in the opposite direction, the signal applied to the control terminal 22 is brought to binary ZERO, while the terminal 15 is at binary ONE. Thus the switch 19 is open except when closed by the circuit 20 and the capacitor 16 is charged by a negative voltage.

Therefore the amplifier 26 receives an error signal through the resistor 25 which is amplified and applied to the motor 2 as a voltage which tends to cause the motor to rotate in the direction opposite to the preceding one. In the prior art circuit shown in FIG. 1, the switches 11, 12, 18, 19 consist of solid state devices such as transistors as a result of which their control circuit must work at different voltage levels, respectively positive and negative, for the two speed control loops. Thus it is neccessary that separate circuits for forward and reverse motor control be provided, at least after the inverter 8. The present invention is concerned primarily with means whereby such separate circuits and duplication of components may be avoided.

Figure 2:
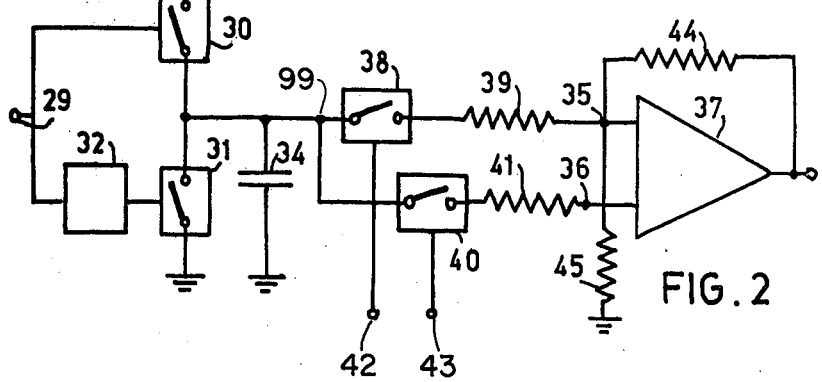
FIG. 2 shows schematically the improvements introduced according to the present invention, as regards the system shown in FIG. 1.

In FIG. 2 only that portion of speed control loop which contains the modifications according to this invention is shown. The portion included is that which follows the output of the inverter 8, the terminal 29 representing the output of the inverter 8.

The error pulses at the output of the inverter 8 cause the closing of the switch element 30 and, through the differentiating circuit 32, the closing of the switch element 31, the operation and the relative timing of two switch elements 30 and 31 being identical with those of two switch elements 11 and 12 already described in FIG. 1.

In particular, the constant current generator 33 is fed by the positive voltage source +V and provides for charging of the capacitor 34 as long as the switch element 30 is closed, while the switch element 31 provides for grounding or discharging the capacitor 34.

According to the invention, the error voltage, present on the terminals of the capacitor 34, is selectively applied, by way of a terminal 99, to the two input leads 35 and 36 of the operational amplifier 37, respectively through the switch element 38 and resistor 39 and through the switch element 40 and resistor 41.

The switch elements 38 and 40 are selectively controlled through the input terminals 42 and 43, to which two mutually exclusive signals for forward and backward running of the motor are applied.

The amplifier 37 is provided with a feedback resistor 44 and the inverting terminal is connected to ground through a suitable resistor 45. It is clear that when the switch element 38 is closed and the switch element 40 is open, the operation of the circuit is like the one already described with respect to FIG. 1.

The input leads of the amplifier are virtually at the same potential as ground, therefore no current flows through resistor 45.

The amplifier gain is given by $A' = -R_f/Ra$, where $R_f$ is the resistance 44 and $Ra$ is the resistance 39.

On the other hand when the switch element 40 is closed and the switch element 38 is open, the input terminal 36 of the operational amplifier rises to a voltage Vi, which is the charging voltage of the capacitor 34. In fact the voltage drop across the resistor 41 is negligible since the amplifier input impedance is virtually infinite. The terminal 35 also is virtually at the same voltage Vi.

Therefore the amplifier output voltage is given by $Vi/Rb + Vi - e/R_f = O$ where $R_b$ is the value of the resistance 45. Thus, $$\frac{e}{Vi} = A'' = 1 + R_f/R_b$$

and by an appropriate choice of the $R_b$ value, the gain $A''$ may be made equal, at absolute value, to $A'$.

The feeding of the terminal 36 by a voltage Vi is functionally equivalent to the feeding by a negative control voltage (equal to $-Vi$) through the resistor 39, therefore the control loop provides for controlling the motor speed in the opposite direction to the preceding one with identical control characteristics (gain and frequency response).

To avoid possible voltage drifts of the terminal 36 when the control system is used for a direct speed controll and therefore the switch element 40 is open, it is convenient to connect the terminal 36 to ground through a resistor 46 of proper resistance, as shown in FIG. 3. In this case also, by an appropriate choice of the resistances 41, 45 and 46, it is possible to obtain the same values of the amplifier gain in both cases of direct and inverse control.

From the above considerations, it is clear that by means of a single frequency-to-voltage transducer circuit and by commutating the error voltage on either input lead of the operational amplifier on the control loop it is possible to obtain a bidirectional speed controll. Thus a considerable constructive simplification and a large saving are achieved.

The switch elements 38 and 40 may conveniently consist in two field-effect transistors 47 and 48, as shown in FIG. 3, which however have the drawback of requiring negative control voltages. This may cause difficulties or constructive complications, when the control logic circuit is implemented by circuital technologies which supply positive control signals. This occurs, for instance, in the bipolar circuital technology, known under TTL acronym.

This drawback may be obviated by making use of the circuit represented in FIG. 4. In FIG. 4 the voltage Vi on the terminal 99 is selectively applied to two input terminals 35 and 36 of the operational amplifier through the series connected resistors either 49, 50 or 51, 52. The selective control is obtained by two transistors 53 and 54 which selectively ground the node common to two resistors either 49 and 50 or 51 and 52, respectively.

By means of suitable positive and mutually exclusive control signals it is possible to let either transistor go ON alternatively. When the transistor 53 is OFF and the transistor 54 is ON, the terminal 36 is connected to ground through the resistor 52.

If $R_1$ is the sum of the resistances 49 and 50, the amplifier gain is given by $$a' = -\frac{R_f}{R_1}$$

If $\alpha R_1$ is the value of the resistance 50, it is easy to verify when the transistor 53 is on and the transistor 54 is off, the gain is:

$$a'' = \frac{R_f}{\alpha R_1} + 1$$

and by a suitable choice of $\alpha$, that is the ratio between two resistors 49 and 50, it is possible to obtain the same gain in both conditions. It appears clearly that the same result may be obtained by a suitable choice of the ratio $\alpha$ and by adding resistors of suitable value, which ground directly one of two terminals 35, 36 or both. As a consequence, there always is a way for grounding of capacitor 34 through either the resistor 49 and transistor 53 or the resistor 51 and transistor 54, respectively. This causes no problem, as the capacitor 34 is periodically discharged and charged, and the resistors 49 and 51 may have enough values, in order that, also by modest values of capacity, the time constant RC of the network is high enough for avoiding significant voltage variations during the interval between a charge operation and following discharge operation.

In the above described embodiments, it appears clearly that the bidirectional control of motor speed may be obtained, by making use of a single control loop which commutes selectively the feedback signal on either input lead of the operational amplifier.

FIG. 5 shows the wiring diagram of a preferred embodiment, where a single control loop is substantially used and a minimum number of components are duplicated. As will be apparent from the following detailed description, the final stage of the constant current generator, the output capacitors of frequency-to-voltage transducer circuit and the short circuit switch elements of said capacitors are duplicated. This components duplication allows the selective application of the feedback signal to the amplifier inputs by controlling the short-circuiting switch elements and therefore is compensated by the elimination of devices specifically and exclusively provided for this end. The portion of the control loop circuit, which does not differ from the one above shown with reference to FIG. 1, is shown in schematic block diagram form by making use of the same reference numerals.

FIG. 5 shows the tachometer disk 1, the motor 2, the light source 3 and the photosensitive element 4, the circuit 5, which produces a square wave signal, the one shot circuit 6, the one shot circuit 7 and the inverter circuit 8.

The output signal of the inverter 8 is formed by a sequence of pulses (which we can suppose positive) of a duration proportional to the difference between the reference period and the real period of pulses supplied by the tachometer disk. The variable length pulses supplied by the one shot circuit 7 and the inverter 8, are applied to the terminal 60 and through a resistor 62, to the base of the transistor 61, whose emitter is grounded and whose collector is fed by a positive voltage source +V, through both series connected resistors 63 and 64.

The point common to both resistors 63 and 64 is connected to the base of both transistors 65 and 66, whose emitters are connected to the voltage source +V through the resistors 67 and 68 respectively. The collectors of two transistors 65 and 66 are connected to a terminal of two capacitors 69 and 70, respectively, whose other terminals are grounded. When the terminal 60 is at a zero voltage, the transistor 61 is OFF and no current flows through resistors 63 and 64. Therefore the bases of both transistors 65 and 66 are at a voltage +V and also the transistors 65 and 66 are OFF.

However, when the terminal 60 is at a positive voltage, and this occurs during the error pulses, the transistor 61 goes ON and the bases of both transistors 65 and 66 are at a voltage whose value is fixed by a voltage +V and by the ratio between two resistances 63 and 64. Therefore, the transistors 65 and 66 are ON and their respective collectors deliver a constant current, for charging the capacitors 69 and 70, whose value results from the resistance 67 and 68 and from the base voltage referred to the voltage +V.

Thus, functionally the described circuits represent a constant current generator 71 (corresponding to the generator 9, in FIG. 1) but provided with two output leads and a switch element 72 (corresponding to the switch element 11, in FIG. 1).

The terminal 60 is also connected to a differentiating circuit 73. This circuit comprises transistors 76, 77, resistors 78, 79, 80, 81, capacitor 82, diode 83 and Zener diode 84 and provides a positive control pulse for a short time interval under control of the leading edge or rise front of the pulses applied to the terminal 60. This is obtained substantially by using the pulse generator circuit comprising the capacitor 82 and resistor 80, driven by transistor 76. In rest conditions, that is, when no pulse is applied to the input, the transistor 76 is OFF and its collector, fed by the voltage source +V through resistor 79, is at a positive potential, defined by the Zener voltage of the Zener diode 84.

Transistor 77, having its base connected to the voltage source +V through resistor 80 is ON, and its collector is at a practically zero voltage. When the positive pulse is applied, through resistor 78, to the base of transistor 76, this transistor goes ON, and the collector voltage decreases abruptly. This voltage decrease is transferred, through capacitor 82, to the base of transistor 77 which goes OFF.

The duration of this condition depends on the time constant RC of the differentiating circuit, as the capacitor 82 is discharged through resistor 80 and the voltage of the base of transistor 77 increases, until the transistor 77 goes ON.

Therefore, for a short period, which can be set at any suitable value, transistor 77 is OFF and its collector goes to positive voltage.

The collector of transistor 77 is connected, through two diodes 85 and 86, to the bases of two transistors 87 and 88, respectively. By a positive voltage, applied to the collector of the transistor 77, transistor 87 and 88 go ON. They are connected in parallel respectively to the capacitors 69 and 70, which are discharged through said transistors. The bases of both transistors 87 and 88 are also connected, through two diodes 89 and 90, to two control terminals 91 and 92, respectively. The capacitors 69 and 70 are respectively connected, through the resistors 93 and 94, to the inverting and not inverting input lead of the operational amplifier 95. Thus, by selectively applying a positive control signal to either terminal 91 or 92, it is possible to maintain either capacitor 69 or 70 discharged and to apply selectively to one input lead of the amplifier an error voltage, while the other input lead is grounded.

The amplifier gain is equalized for both cases by a resistor 96 (or by a proper pair of resistors, as shown in FIG. 3). Finally the output lead of the amplifier 95 is connected directly, or through a power amplifier stage, to the motor 2. Therefore the described control loop capable of controlling the forward and backward motor speed, by applying the error signal to either input lead of the operational amplifier.

The schematic diagrams and circuits shown and described refer to the preferred embodiments of this invention. Clearly, many different changes may now be introduced by those skilled in the art, without departing from the spirit and scope of the invention.

What is claimed is:

1. A bidirectional speed regulation system for a d.c. motor, comprising:
   a transducer device for supplying pulses having a frequency related to the motor speed;
   circuit means for comparing the period of said pulses with a reference period and for supplying periodic pulses whose duration is equal to the difference between said reference period and said period related to the motor speed;
   a constant current generator fed by a voltage source, said generator having two independent output leads for providing a current of the same polarity on each lead;
   circuit means for supplying a short control pulse in coincidence with each of said periodic pulses;
   a pair of capacitors, each connected to one of said independent output leads;
   a switching device controlled by said periodic pulses, for controlling the charge on said pair of capacitors, during the duration of said periodic pulses;
   a pair of switching devices for short circuiting said pair of capacitors for the whole duration of said control pulses;
   a conditioning logic circuit, controlled by external signals for selectively controlling said pair of switching devices and for selectively short circuiting, for the whole duration of said external signals, either one of said pair of capacitors; and an operational amplifier for driving said motor, said amplifier including an inverting and a non-inverting input lead, an output lead connected to said motor and coupled through a feedback path to said inverting input lead, each of said input leads being connected to one of said pair of capacitors through a separate resistor so as to be coupled to ground through its resistor whenever the corresponding capacitor is short circuited.

2. In a bidirectional speed regulation system for a d.c. motor which includes transducer means for producing output pulses at a frequency related to motor speed, pulse generating means connected to said transducer means for producing error pulses of a duration proportional to the difference between actual motor speed and desired motor speed, capacitor means connected to said pulse generating means for producing an error voltage proportional to said difference, and operational amplifier means connected to said capacitor means for driving the motor, said operational amplifier means having an inverting input terminal and a non-inverting input terminal; the improvement comprising:

first switching means for connecting said error voltage which may be present during rotation of the motor in one direction to said inverting input terminal of the operational amplifier means whereby to regulate motor speed in said one direction;

second switching means for connecting said error voltage which may be present during rotation of the motor in the opposite direction to said non-inverting input terminal of the operational amplifier means whereby to regulate motor speed in said opposite direction;

said operational amplifier means further including a feedback path of resistance Rf connected to said inverting input terminal, whereby the gain $a'$ of said amplifier means is $$-\frac{R_f}{R_a}$$

when said error voltage from said capacitor means is applied to said inverting input terminal with Ra being the input impedance, and wherein said inverting input terminal is referenced to ground through a resistance of value Rb when said error voltage from said capacitor means is applied to said non-inverting input terminal, whereby the gain $a''$ of said amplifier means in response to such input to the non-inverting terminal is $$1 + \frac{R_f}{R_b}, \text{ and wherein } |a'| = |a''|.$$

and wherein $|a'| = |a''|$.

3. A bidirectional speed regulation system for a d.c. motor which comprises, in combination:

transducer means for producing a pulse train of a frequency related to rotational speed of an associated motor to be regulated;

wave shaping means connected to the output of said transducer means for converting said pulse train to a second pulse train of corresponding frequency with each pulse of said second pulse train having a selected duration $T_o$ which is substantially equal to the period of that pulse train produced by said transducer means when the associated motor is rotating at the desired regulated speed;

inverter means connected to said wave shaping means to produce an error signal which is constituted of pulses of duration $T-T_o$ where T is the period of the rotational frequency of the associated motor, whereby the pulses of said error signal are of decreasing duration as the motor speed approaches said desired regulated speed;

a constant current source, capacitor means for charging from said current source, and a switching device between the current source and said capacitor means for controlling the duration of charging of the latter;

said error signal being connected to said switching device for closing same during the durations $T-T_o$, and means for rapidly discharging said capacitor means at the beginning of each of said pulse of the error signal, whereby said capacitor means charges to decreasing voltage levels as the motor approaches said desired regulated speed;

an operational amplifier having an inverting input terminal and a non-inverting input terminal; and switching means for connecting the output voltage derived from said capacitor means selectively to said inverting input terminal and said non-inverting input terminal.

4. A bidirectional speed regulation system as defined in claim 3 wherein said switching means includes a pair of input terminals adapted to receive external control signals selectively to apply said output voltage from said capacitor means to said inverting input terminal during rotation of the associated motor in one direction and to said non-inverting input terminal during rotation of the motor in the opposite direction.

5. A bidirectional speed regulation system as defined in claim 4 including circuit elements connected to said inverting and non-inverting input terminals such that $|a'| = |a''|$ where $a'$ is the gain of said amplifier in response to input to its inverting input terminal and $a''$ is the gain of said amplifier in response to input to its non-inverting input terminal.

6. A bidirectional speed regulation system as defined in claim 3 including circuit elements connected to said inverting and non-inverting input terminals such that $|a'| = |a''|$ where $a'$ is the gain of said amplifier in response to input to its inverting input terminal and $a''$ is the gain of said amplifier in response to input to its non-inverting input terminal.

7. A bidirectional speed regulation system for a d.c. motor, comprising in combination:

means for producing a train of error pulses of frequency related to rotational speed of an associated motor to be regulated and of durations which decrease as the regulated speed approaches a desired value;

capacitor means receiving said error pulses for producing an error voltage signal proportional to the difference between actual motor speed and said desired value;

an operational amplifier for regulating the speed of the associated motor, said operational amplifier having conventional input terminals which respectively are inverting and non-inverting input terminals; and switching means for selectively connecting said error voltage signal to said inverting input terminal to regulate motor speed in one direction of motor rotation and connecting said error voltage signal to said non-inverting input terminal to regulate motor speed in the opposite direction of motor rotation, said switching means including a pair of input terminals adapted to receive external control signals to selectively apply said error voltage signal from said capacitor means to said inverting input terminal during rotation of the associated motor in said one direction and to said non-inverting input terminal during rotation of the motor in said opposite direction.

8. A bidirectional speed regulation system as defined in claim 7 including circuit elements connected to said inverting and non-inverting input terminals such that $|a'| = |a''|$ where $a'$ is the gain of said amplifier in response to input to its inverting input terminal and $a''$ is the gain of said amplifier in response to input to its non-inverting input terminal.

9. A bidirectional speed regulation system as defined in claim 7 including circuit elements connected to said inverting and non-inverting input terminals such that $|a'| = |a''|$ where $a'$ is the gain of said amplifier in response to input to its inverting input terminal and $a''$ is the gain of said amplifier in response to input to its non-inverting input terminal.

10. In a speed regulation system as defined in claim 7 wherein said operational amplifier means includes a feedback path of resistance Rf connected to said inverting input terminal whereby the gain $a'$ of said amplifier means is $$-\frac{R_f}{R_a}$$

when said error voltage signal from said capacitor means is applied to said inverting input terminal with Ra being the input impedance, and wherein said inverting input terminal is referenced to ground through a resistance of value Rb when said error voltage signal from said capacitor means is applied to said non-inverting input terminal, whereby the gain $a''$ of said amplifier means in response to such input to the non-inverting terminal is $$1 + \frac{R_f}{R_b}, \text{ and wherein } |a'| = |a''|.$$

and wherein $|a'| = |a''|$.

11. Bidirectional speed regulation system for a d.c. motor comprising:
 a transducer device for supplying pulses having a frequency related to the motor speed;
 circuit means for comparing the period of said pulses with a reference period and for supplying periodic pulses, whose duration is equal to the difference between said reference period and said period related to the motor speed;
 a constant current generator fed by a voltage source;
 circuit means for supplying a short control pulse, in coincidence to said periodic pulses;
 a capacitor connected to the output lead of said constant current generator;
 a first switching means controlled by said control pulses for short circuiting said capacitor;
 a second switching means, controlled by said periodical pulses, for connecting said capacitor to said constant current generator during the duration of said periodical pulses;
 an operational amplifier provided with two input leads, respectively inverting and not inverting for driving said motor; and
 capacitor switching means for applying the charge voltage of said capacitor, through a resistor, to either input lead selectively, according to the required direction of motion.

12. The regulation system of claim 11, wherein said capacitor switching means comprises two field-effect transistors, each being series connected to the said either input lead.

13. The regulation system of claim 11, wherein said capacitor switching means comprises in addition two transistors for selectively grounding said either input lead.

* * * * *

UNITED STATES PATENT OFFICE
CERTIFICATE OF CORRECTION

PATENT NO. : 4,008,424

DATED : February 15, 1977

INVENTOR(S) : Gian Battista Bompani

It is certified that error appears in the above-identified patent and that said Letters Patent are hereby corrected as shown below:

Column 9, line 57, delete "and wherein $|a'| = |a''|$.

Column 12, line 7, delete "and wherein $|a'| = |a''|$.

Signed and Sealed this nineteenth Day of July 1977

[SEAL]

Attest:

RUTH C. MASON
*Attesting Officer*

C. MARSHALL DANN
*Commissioner of Patents and Trademarks*